Feb. 14, 1928.
H. E. SLADE
ELECTRICAL OUTLET DEVICE
Filed Dec. 11, 1926
1,658,862
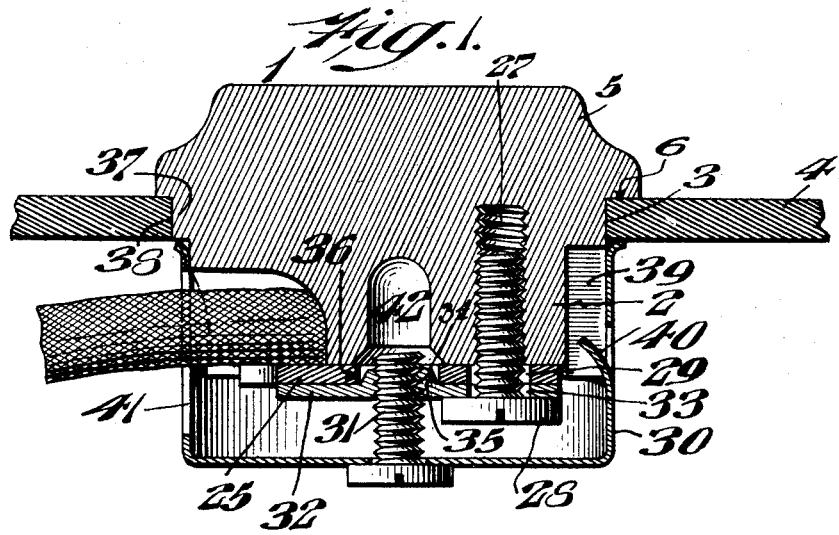
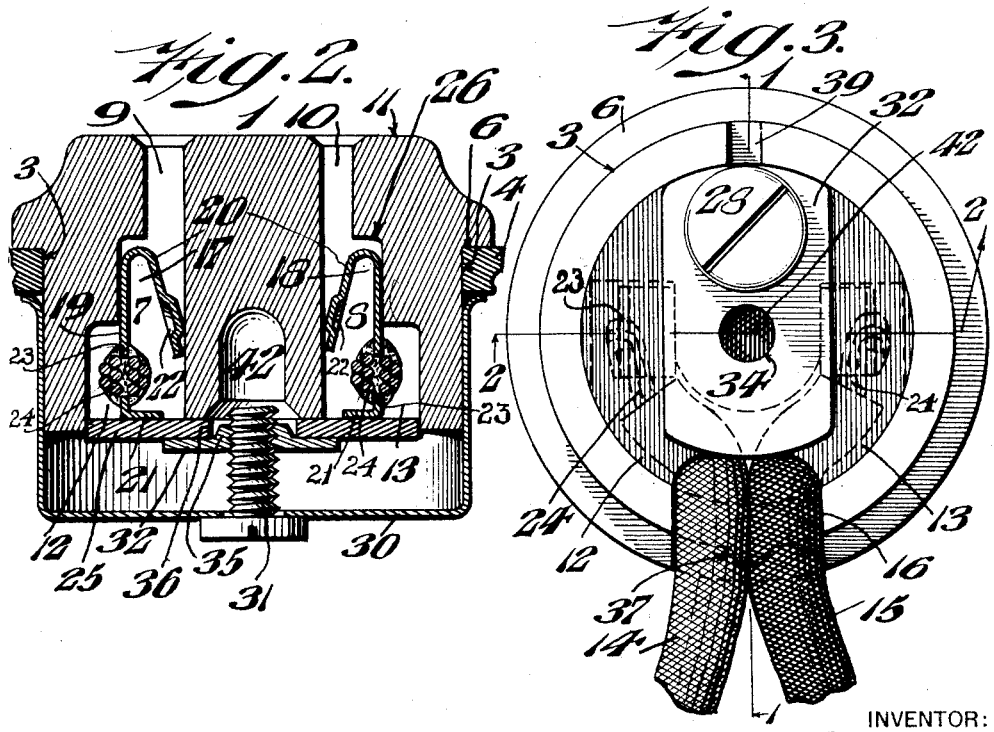
INVENTOR:
HAROLD E. SLADE,
BY
ATTORNEYS.

Patented Feb. 14, 1928.

1,658,862

UNITED STATES PATENT OFFICE.

HAROLD E. SLADE, OF GLEN RIDGE, NEW JERSEY, ASSIGNOR TO BEAVER MACHINE & TOOL CO., INC., OF NEWARK, NEW JERSEY, A CORPORATION OF NEW JERSEY.

ELECTRICAL OUTLET DEVICE.

Application filed December 11, 1926. Serial No. 154,165.

My invention relates to a new and useful improvement in electrical outlet devices of the type adapted to be used in conjunction with the conventional blade type of electrical connector plugs, and it relates more particularly to an electrical outlet device of this character, adapted to be mounted or installed in the walls of electrical fixtures and to be carried by said walls, or to be mounted in and carried by a suitable relatively thin panel or wall plate or the like, and to have the major portion of its body concealed in said supporting wall, panel or plate, and having only its receiving end positioned exteriorly of such panel or wall.

My invention relates more particularly to an electrical outlet device of the character stated, comprising an insulating housing having suitable contact receiving recesses therein, removable spring contacts in said recesses, an insulating closure, and means for detachably securing said closure member to said housing in such a manner as to confine within it the contact members as well as the terminals of the electrical conductors, secured to such member, thereby to constitute a unitary assembly, wired completely and ready to be mounted in any wall of an electrical fixture, or any supporting panel, wall plate or the like, and means cooperating with said housing, to secure such unitary assembly in said wall or panel, which is quickly mountable and detachable at will, and the attachment or detachment of which will not in any way disturb the unitary assembly of said electrical outlet device, that is, will not in any way disturb the electrical connection between the electrical conductors and the spring contacts, nor will it dislodge the contact members within the housing.

By the novel construction of my present construction, I am enabled to produce an electrical outlet device of this character, adapted chiefly to be used in connection with, and mounted upon, electrical fixtures, by inserting the same through the walls thereof or to be mounted upon relatively thin panels or plates, which may be wired and then assembled and retained in the assembled condition while the same is being mounted in the supporting wall or panel, thereby greatly facilitating the installation of said electrical outlet device, since the component parts of the assembled unit are non-separable and means surrounding the inner or concealed portion of said housing for firmly securing said device to the supporting wall or panel, in an easy and quickly detachable manner.

With the above ends in view, my present invention consists of an insulating housing, having a reduced diameter inner portion adapted to be inserted into the apertured wall of the electrical fixture or into any suitable apertured panel, wall plate or the like, and having an outer enlarged diameter portion adapted to be positioned exteriorly of such wall, panel, or plate and having a transverse annular shoulder, intermediate of said portions of different diameters, adapted to abut the outer surface of said wall, panel or plate. The insulating housing includes longitudinal contact chambers, corresponding blade receiving apertures extending from the outer face of said insulating housing to said contact chambers, contact members within said chambers having spring blade engaging members in operative alignment with said blade receiving apertures, and an insulating closure member extending over the inner end of said housing, to enclose said contact chambers. My invention further consists of a metallic assembling plate, on said insulating closure member, having a threaded opening therethrough in alignment with the axis of said housing, and having a second opening therethrough, spaced from said threaded opening, an assembling screw extending through said second opening and through said insulating closure and threaded into said housing, thereby firmly to secure said insulating closure as well as said assembling plate to said housing and thereby to confine within it the spring contact members and to maintain said elements of the structure in an assembled and permanent relation to each other, as a unit.

My invention further consists of a generally cup shaped metallic securing shell, encasing the inner portion of said housing and assembled unit, and being of a depth slightly greater than the depth of said housing, and a mounting screw extending through the end wall of said cup shaped securing member and threaded into the axial threaded opening in said assembling plate, thereby to draw said housing and said securing member together, and thus to clamp said apertured supporting wall, panel or plate, between the transverse annular shoulder of said housing, and the free peripheral edge of said cup shaped securing member, and thereby also firmly to secure the entire outlet device within and upon said wall, panel or plate.

For the purpose of illustrating my invention, I have shown in the accompanying drawings, forms thereof which are at present preferred by me since they will give in practice, satisfactory and reliable results, although it is to be understood that the various instrumentalities of which my invention consists can be variously arranged and organized and that my invention is not limited to the precise arrangement and organization of these instrumentalities as herein shown and described.

Referring to the drawings, in which like reference characters indicate like parts, Figure 1 represents a vertical section on line 1—1 of Figure 3, illustrating the separate assembling and mounting of my novel electrical outlet device.

Figure 2 represents a section on line 2—2 of Figure 3.

Figure 3 represents a bottom plan view of my novel electrical outlet device, with the securing shell removed therefrom, so as to expose to view the general arrangement of the insulating closure and the metallic assembling plate secured thereon.

Having reference to the foregoing figures of the accompanying drawings, the electrical outlet device of my present invention comprises, first, an insulating housing 1 formed of any suitable material such as hard rubber, bakelite, porcelain or any other suitable insulating composition, having a reduced diameter inner portion 2, adapted to be inserted into a suitable aperture 3, in any supporting wall, panel or plate 4, and to be concealed from without, and having the enlarged diameter outer receiving portion 5, exteriorly of said wall 4, and a transversely extending annular shoulder 6, intermediate said portions 2 and 5, of different diameters, extending substantially at a right angle to the axis of the housing, and adapted to abut the outer surface of the wall, panel, or plate 4.

The insulating housing 1 is provided with a pair of opposed longitudinal contact chambers 7 and 8 respectively, spaced equidistantly from the axis of the housing, and blade receiving apertures 9 and 10 extending between the outer surface of said housing and said contact chamber. A pair of transverse conductor channels 12 and 13 are also provided for receiving the corresponding electrical connectors 14 and 15; said two channels 12 and 13 merging at their outer ends in a common wire or conductor receiving recess 16 in said housing, through which the conductors 14 and 15 are adapted to enter the electrical outlet device, and open into the respective contact chambers 7 and 8 at their inner ends, as indicated in Figure 2.

Electrical contact members 17 and 18 are disposed within the corresponding contact chambers 7 and 8 respectively, each of said contact devices comprising an upright member 19, a resilient blade engaging member 20 bent back upon the upright body member 19, so as to form a general U shaped contour therewith, and the lower terminal foot member 21 extending at substantially a right angle to the body member 19. The resilient blade engaging members 20 are provided with slight projections or bosses 22, and are disposed in operative alignment with the blade receiving recesses 9 and 10 respectively, so as frictionally to engage the blades (not shown in the drawings) of the conventional plug type of electrical connector, when the same are inserted into the outlet device; said slight projections or bosses 22 being adapted to seat within corresponding recesses or depressions usually provided in the blades of the conventional type of plug connectors.

Each of the contact members 17 and 18 may also be provided with an aperture 23, indicated in dotted lines in Figure 3, extending through the upright body portion 19 thereof, through which the bare terminals 24 of the electrical conductors 14 and 15 may be extended for the purpose of providing secure engagement between the metallic wires 24 and the contact members 17 and 18. The wires 24 may also be further secured and electrically connected with the contact members 17 and 18 by soldering or other suitable means.

In order securely to maintain the contact members 17 and 18 within the housing 1, an insulating closure member 25 is provided preferably in the form of a circular disc, which is positioned in the inner end of the housing, in a manner shown particularly in Figure 2, thereby to enclose the contact chambers 7 and 8 thereof and also to confine the contact members 17 and 18, between said closure member 25 and the transverse shoulders 26 formed between contact chambers 7 and 8 and the corresponding and somewhat narrower blade receiving apertures 9 and 10 respectively. Any longitudinal displacement of the contact members 17 and 18 is thereby prevented. If desired, the insulating body housing 1, may be recessed at its inner end, to a depth substantially equal to the thickness of the closure 25, so that said closure member may be set into the housing.

In order to retain the electrical contact members 17 and 18, as well as the electrical connectors 14 and 15 and the insulating closure, 25, in assembled relation to each other, while the assembled unit is mounted in an apertured electrical fixture, wall plate or the like, a threaded opening 27 is provided in the housing 1, spaced a suitable distance from the axis of the housing, and a suitable assembling screw 28 is extended through a corresponding and aligned opening 29 in the insulating closure 25, and is threaded into said opening 27.

While in Figure 1 the threads of the opening 27 are shown cut directly into the body of the housing 1, yet it is within the scope of my invention to provide an internally threaded metallic bushing within the housing, in place of the bare threaded opening 27, and suitably anchored within the housing, adapted to receive the assembling screw 28. The choice of using an internally threaded metallic bushing instead of the bare opening 27, depends chiefly on the character of the material of which the housing 1 of the outlet device is formed.

By tightening the screw 28 onto the insulating closure 25, the insulating closure is firmly secured to the housing 1, thereby retaining within the housing, not only the contact members 17 and 18, but also retaining the electrical conductors 14 and 15, in assembled relation to the housing 1.

In order firmly to secure the electrical outlet device of my novel construction, within the apertured wall, panel, or plate 4, a metallic and generally cup shaped clamping shell 30 is positioned over the inner portion of the completely wired and assembled outlet unit, heretofore described; the depth of said cup shaped securing member 30 being slightly greater than the overall depth of the inner portion of the housing 1, and a suitable mounting screw 31 is extended through the terminal wall of the cup shaped securing member 30, coaxially with respect thereto and with respect to the housing 1, and is threadedly engaged with the housing 1, by suitable means, to be described hereinafter.

By means of the mounting screw 31, the assembled unit heretofore described, is drawn towards and into the cup shaped securing member 30, thereby clamping the supporting wall, panel or plate 4, around the periphery of the aperture 3 thereof, between the transverse annular shoulder 6 of the insulating housing 1, and the free peripheral edge of the cup shaped metallic housing 30. By so clamping the supporting wall between the insulating housing 1 and the metallic shell 30, the electrical outlet device is firmly secured to and within the wall 4.

The threaded anchorage on the assembled unit, that is, upon the housing 1, for the mounting screw 31, is formed by a metallic assembling plate 32, provided with an aperture 33 for receiving the assembling screw 28, whereby said assembling plate 32 may be secured to the housing 1, in a manner shown particularly in Figure 1. Thus in the preferred embodiment of my invention, the plate 32 is placed directly upon the insulating closure 25, and the assembling screw 28 passes through the assembly plate 32 as well as through the insulating plate 25. By this means, not only is the assembly plate 32 secured firmly to the housing 1, but said assembly plate 32 also serves the double function of reinforcing the relatively thin insulating closure 25.

In order to provide a threaded screw anchorage for the mounting screw 31, the assembly plate 32 is provided with an internally threaded opening 34, on the axis of the housing 1, and is also preferably provided with an inwardly extending projection 35 at the opening 34, thereby to increase the effective length of said threaded opening 34 and thus to provide a more substantial threaded anchorage for the screw 31. The insulating closure 28 is also provided with a central aperture opening 36, through which the screw 31 may extend, while the housing 1 is also preferably provided with a clearance recess or opening 42, to allow for an adjustment of the screw 31.

Thus, according to my present novel construction the electrical outlet device is assembled, first, by suitably attaching the electrical conductors 14 and 15 to the contact members 17 and 18, then covering the contact chambers by an insulating closure member 25, and positioning a metallic assembly plate 32 over the insulating closure. An assembly screw 31 is then passed through the assembly plate 32 as well as the insulating closure member 25, so as firmly to secure both to the housing. The assembly thus formed, may then be readily mounted in any suitable opening 3 in any wall, panel or plate 4, by merely inserting the inner portion thereof into said opening 3, and applying the cup shaped metallic shell 30, in the manner hereinbefore described, by means of the mounting screw 31, extending through the terminal wall of said cup shaped shell 30, and threaded into the assembling plate 32.

By means of this novel construction, a very efficient, durable and inexpensive electrical outlet device is produced, which may be wired and assembled with the greatest ease and facility, and which may be mounted on a fixture, wall, or panel, also with ease and without any attention to the component elements of the outlet device, since the same are held firmly in position by means of the assembly screw 28, the assembly plate 32 and the insulating closure 25. Moreover, by the use of the assembly plate 32, the relatively extensive internally threaded bushings, moulded or embedded in the housing, are entirely eliminated and an effective anchorage is provided for the mounting screw 31.

In order to prevent any rotation of the electrical outlet device, within the aperture 3, a suitable projection 37 may be provided on the housing 1, and a corresponding recess 38 may be provided in the periphery of the opening 3, to receive said projection and thereby to lock said housing 1, within said aperture 3 against rotation. In order also to secure the shell 30 against rotation with respect to the housing 1, the housing 1 may be provided with a longitudinal recess 39, while the shell may be provided with an inwardly projecting locking tongue 40, pressed out of the wall of the shell 30 and adapted to enter the recess 39, thereby to interlock said housing 1 and said shell 30 against relative rotation. A recess 41 is also provided within the wall of the shell 30, corresponding to the inlet recess 16 in the housing, to permit the entrance of the electrical conductors 14 and 15 into said housing.

As will be seen in Figure 1, the depth of the securing shell 30 is slightly greater than the effective overall depth of the inner portion of the housing 1. This excess in depth of the shell 30 permits of an adjustment of the outlet device of my novel construction, to the supporting wall, panel, or plate 4, of varying thicknesses. Thus, if the thickness of the plate 4 is reduced considerably, it is merely necessary to tighten up the screw 31 to the desired extent until the peripheral edge of the shell 30 engages and clamps said wall 4. By this means, my novel electrical outlet device is applicable to a great variety of uses, such as electrical lighting fixtures, instrument panels, as well as wall plates of standard electrical outlet boxes.

It will now be apparent that I have devised a novel and useful construction of electrical outlet device which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent is:—

1. The combination with an apertured supporting wall, of an electrical wiring device, comprising an insulating housing having a reduced diameter inner portion adapted to project through said aperture in said supporting wall, and an enlarged diameter outer portion disposed exteriorly of said supporting wall and having a transverse annular shoulder intermediate said portions of different diameters, recesses within said housing, electrical contacting means within said recesses, an insulating closure member on the inner end of said housing and enclosing said recesses thereof, an assembling screw extending through said insulating closure and firmly securing the same to the housing, thereby to retain the operative elements thereof in assembled relation to each other, a metallic assembling plate on said insulating closure and secured thereto and to said housing, said assembling plate having a threaded opening therein, a metallic clamping member straddling the inner portion of said housing with its free edges bearing against the inner surface of said supporting wall, and a mounting screw passing through said clamping member and anchored in the threaded opening in said assembling plate, thereby to clamp the supporting wall between the free terminal edges of said clamping member and the transverse annular shoulder of said insulating housing.

2. The combination with an apertured supporting wall, of an electrical wiring device, comprising an insulating housing having an inner reduced diameter portion adapted to project through said aperture, and an enlarged diameter outer portion disposed exteriorly of said supporting wall, having a transverse annular shoulder intermediate of said portions of different diameters, and said housing having recesses therein, electrical contact members within said recesses, an insulating closure member on the inner end of said housing and enclosing said recesses thereof, an assembling screw extending through said insulating closure and into the housing firmly securing the same to the latter, thereby to retain the operative element thereof in assembled relation to each other, a metallic assembling plate on said insulating closure and secured thereto and to said housing, by means of said assembling screw, said assembly plate having a threaded axial opening therein, a cup shaped metallic clamping shell encasing the inner portion of said insulating housing, and a mounting screw passing through said clamping shell and threadedly anchored in the axial opening in said assembling plate, thereby to draw said housing and shell together, and thereby to clamp the supporting wall between the free terminal edge of said clamping shell and the transverse annular shoulder of said insulating housing.

3. In a device of the character stated, an insulating housing having contact chambers therein, contacts wholly contained in said chambers, an insulating closure member for closing said contact chambers and for forming a support for the feet of said contacts, an assembling plate contacting with said insulating closure member, a screw positioned at one side of the axis of said housing and passing through said metallic plate and said insulating closure, and an axial screw engaging said assembling plate and adapted to clamp a clamping shell to said housing.

4. In a device of the character stated, an insulating housing having contact chambers therein, contacts wholly contained in said chambers, an insulating closure member for closing said contact chambers and for forming a support for the feet of said contacts, a metallic assembling plate contacting with said insulating closure member, a screw positioned at one side of the axis of said housing and passing through said metallic plate and said insulating closure, an axial screw engaging said metallic assembling plate and adapted to clamp a clamping shell to said housing, and a cup shaped metal clamping shell engaging the inner portion of said insulating housing, said axial screw passing axially through said cup shaped shell.

5. In a device of the character stated, an insulating housing having its outer periphery of different diameters and provided with recesses, a support for said housing, contacts positioned within said recesses, an insulating closure member on the inner end of said housing and covering said recesses therein, a metallic assembling plate positioned against said insulating closure, an assembling screw passing through said insulating closure member and said metallic assembling plate and in threaded engagement with said housing, said assembling screw being located at one side of the axis of said housing and said assembling plate having a threaded axial opening therein, a cup shaped clamping shell engaging the inner portion of said housing, and a mounting screw passing through said clamping shell and in threaded engagement with the axial opening in said assembling plate, thereby to draw said housing and shell together and to clamp said support between the terminal edge of said clamping shell and the contiguous portion of said insulating housing.

6. A device of the character stated, adapted to be mounted in an apertured supporting wall, said device comprising an insulating housing having a rearward shoulder adapted to engage the front of the supporting wall adjacent said aperture, having a pair of spaced contact chambers extending therethrough, prong-engaging contact members disposed within each of said chambers adapted to receive electrical connection prongs through the outer ends of said chambers, an assembling plate detachably secured to the rear of said housing by threaded means anchored in said housing and a clamping member detachably secured rearwardly of said housing by threaded means anchored in said assembling plate; said clamping member having means disposed in juxtaposition to the rearward shoulder of said housing and adapted to engage the rear face of said supporting wall adjacent the aperture thereof.

7. A device of the character stated, adapted to be mounted in an apertured supporting wall, said device comprising an insulating housing having a rearward shoulder adapted to engage the front of the supporting wall adjacent said aperture, having a pair of spaced contact chambers extending therethrough, prong-engaging contact members disposed within each of said chambers, adapted to receive electrical connection prongs through the outer ends of said chambers, an assembling plate detachably secured to the rear of said housing by threaded means anchored in said housing and spaced from the axis thereof, and a clamping member detachably secured rearwardly of said housing by threaded means anchored in said assembling plate and disposed co-axially with respect to said housing; said clamping member having means disposed in juxtaposition to the rearward shoulder of said housing and adapted to engage the rear face of said supporting wall adjacent the aperture thereof.

8. A device of the character stated, adapted to be mounted in an apertured supporting wall, said device comprising an insulating housing having a rearward shoulder adapted to engage the front of the supporting wall adjacent said aperture, and having a contact chamber therein, a contact member disposed within said chamber, an assembling plate detachably secured to the rear of said housing by adjustable means anchored in said housing and spaced from the axis thereof; said assembling plate confining said contact member within said chamber, and a clamping member detachably secured rearwardly of said housing by adjustable means anchored in said asembling plate; said clamping member having means disposed in juxtaposition to the rearward shoulder of said housing and adapted to engage the rear face of said supporting wall adjacent the aperture thereof.

HAROLD E. SLADE.